United States Patent [19]

Beifuss et al.

[11] 4,388,683
[45] Jun. 14, 1983

[54] DATA TRANSMISSION/RECEIVING DEVICE HAVING PARALLEL/SERIAL AND SERIAL PARALLEL CHARACTER CONVERSION, PARTICULARLY FOR DATA EXCHANGE BETWEEN COMMUNICATING DATA PROCESSING SYSTEMS

[75] Inventors: Wolfgang Beifuss; Paul Birzele; Gerhard Geitz, all of Munich, Fed. Rep. of Germany

[73] Assignee: Siemens Aktiengesellschaft, Berlin & Munich, Fed. Rep. of Germany

[21] Appl. No.: 134,482

[22] Filed: Mar. 27, 1980

[30] Foreign Application Priority Data

May 23, 1979 [DE] Fed. Rep. of Germany ....... 2920994

[51] Int. Cl.$^3$ ............................................. G06F 15/16
[52] U.S. Cl. .................................................... 364/200
[58] Field of Search ... 364/200 MS File, 900 MS File

[56] References Cited

U.S. PATENT DOCUMENTS 4,093,981  6/1978  McAllister et al. ................. 364/200
4,225,919  9/1980  Kyu et al. ............................ 364/200

OTHER PUBLICATIONS

"Interfacing the SAB8080 with Other Microcomputer Devices", *Microprocessor Devices Data Book* 1976/77, Siemens AG, pp. 63–79.

*Primary Examiner*—Raulfe B. Zache
*Attorney, Agent, or Firm*—Hill, Van Santen, Steadman, Chiara & Simpson

[57] ABSTRACT

In a data transmitting/receiving device having parallel/serial and serial/parallel character conversion, particularly for data exchange between communicating data processing systems, and being arranged between a local data processing system and a data modem terminating a data communication line for the purpose of controlling data transmission and/or reception procedures and containing a procedure store, and in which a random access storage is provided as a data buffer for intercepting data jams is provided along with an interrupt control for interrupting processing operations in a microprocessor in respect of higher processing priority, and in which a timer is provided for setting optimum transmission speed, first and second modem connection lines are provided and data messages to be transmitted are converted bit-oriented or character-oriented by the microprocessor from data groups supplied thereto by means of corresponding input switching commands. In addition, the optional transmission of bit-oriented data messages according to the synchronous data link control (SDLC) method or according to the high-level data link control (HDLC) method is provided.

9 Claims, 5 Drawing Figures

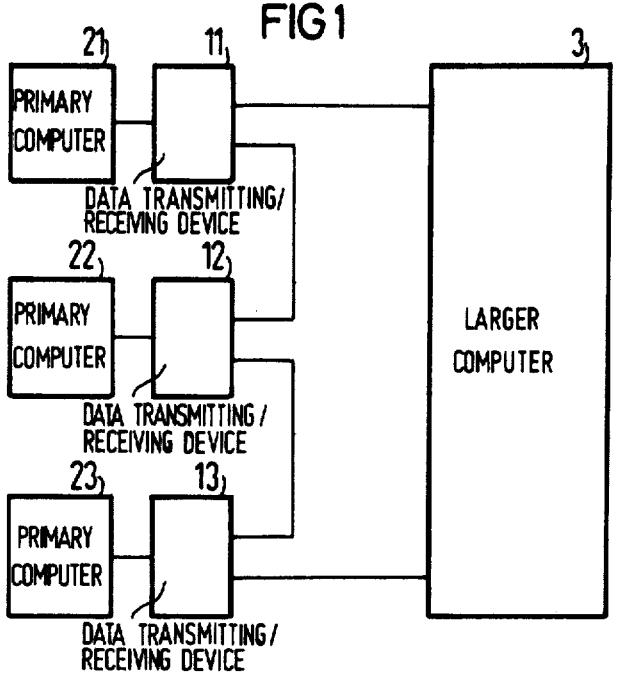
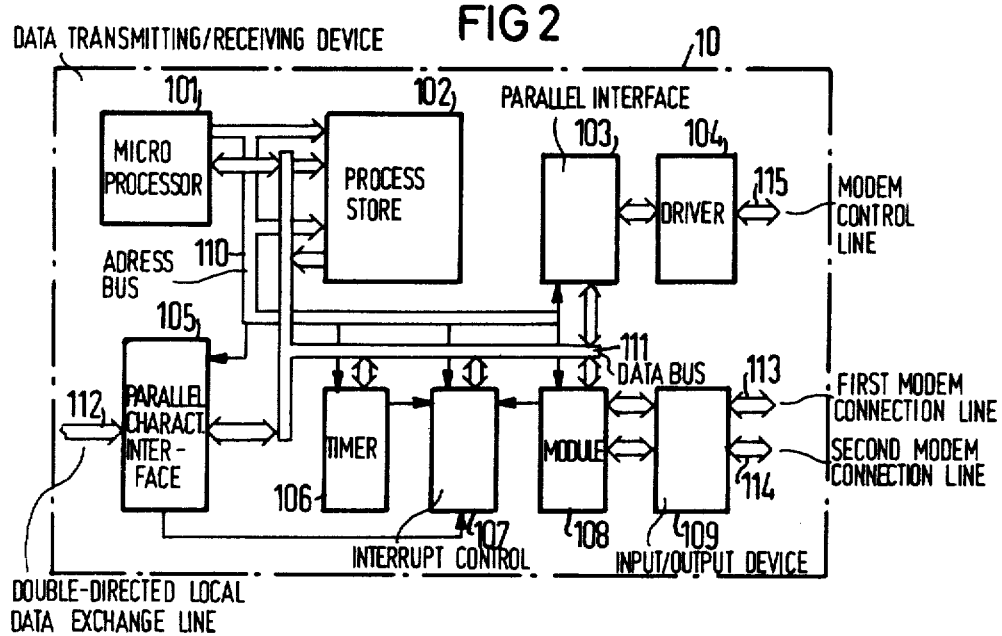

DATA TRANSMISSION/RECEIVING DEVICE HAVING PARALLEL/SERIAL AND SERIAL PARALLEL CHARACTER CONVERSION, PARTICULARLY FOR DATA EXCHANGE BETWEEN COMMUNICATING DATA PROCESSING SYSTEMS

BACKGROUND OF THE INVENTION

1. Field of the Invention

The present invention relates to a data transmitting-/receiving device having parallel/serial and serial/parallel character conversion, and more particularly to such a device which is arranged between a local data processing system and a data modem terminating a data communication line for the purpose of controlling data transmission and/or reception operations and containing a process store, and in which a random access memory is provided as a data buffer for intercepting data jams occurring during transmission and/or reception operations, and interrupt control for interrupting processing operations in favor of operations of higher processing priority, and a timer for setting the respective optimum transmission speed.

2. Description of the Prior Art

Known process controls are usually realized by complex and space-consuming hardware. With such controls, the procedure steps are program controlled, whereby the respective data processing device which communicates with an external data processing system is co-employed. A disadvantage of such an arrangement is that the data processing device is burdened with the required procedure control tasks beyond its actual task, namely to process data. On one hand, a degradation of its operating speed and, on the other hand, a disadvantageous reduction of the storage volume available for processing data can result. A reduced operating speed is particularly disadvantageous in data processing systems which must work in real-time operation.

SUMMARY OF THE INVENTION

The object of the present invention is to provide a data transmitting/receiving device, particularly for data exchange between communicating data processing systems, in which the above-mentioned disadvantages do not occur and, in addition, to provide the possibility of transmitting or receiving data by way of two double-directed data transmission channels separated from one another so that, for example, arrangements of data processing systems in meshed data processing networks is made possible.

Devices constructed in accordance with the present invention are based on the idea of relieving the data processing device of all jobs connected with data communication procedures. Therefore, both a degradation of the data processing operations as well as reduction of the storage volume available for data processing operations are avoided.

According to the present invention, the above object is achieved in a data transmitting/receiving device having parallel/serial and serial/parallel character conversion, of the type generally set forth above, in that a first modem connection line and a second modem connection line are provided, that data messages to be transmitted are transmission-justified optionally converted bit-oriented or character-oriented by a microprocessor from data groups supplied thereto by means of corresponding input switching commands, and that means are provided for the optional transmission of bit-oriented data messages according to the synchronous data link control (SDLC) method or according to the high level data link control (HDLC) method.

Devices constructed in accordance with the present invention offer the advantage that the expense for hardware is decisively reduced by employing a microcomputer comprising a microprocessor and a reprogrammable program store and that the entire data communication procedure can be automatically developed with the data communication processor so that the data processing device is relieved. Moreover, it is advantageous that the data communication processor, which according to the present invention is arranged between the internal data processing device and a data modem terminating a data line, is constructed in modular form of standard modules, so that no expensive development work is required for specific circuits required by a customer. In addition, devices constructed in accordance with the present invention offer the advantage that data can be transmitted or received by way of two separated, double-directed data communication channels, so that, for example, arrangements of data processing systems in meshed data processing networks can be realized.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block diagram of a data processing system having a plurality of transmitting/receiving devices constructed in accordance with the present invention, along with a plurality of primary computers which can communicate with one another and/or with a larger computer by means of the data transmitting/receiving devices;

FIG. 2 illustrates, in block diagram form, a data transmitting/receiving device constructed in accordance with the present invention;

DESCRIPTION OF THE PREFERRED EMBODIMENTS

Figure 3:
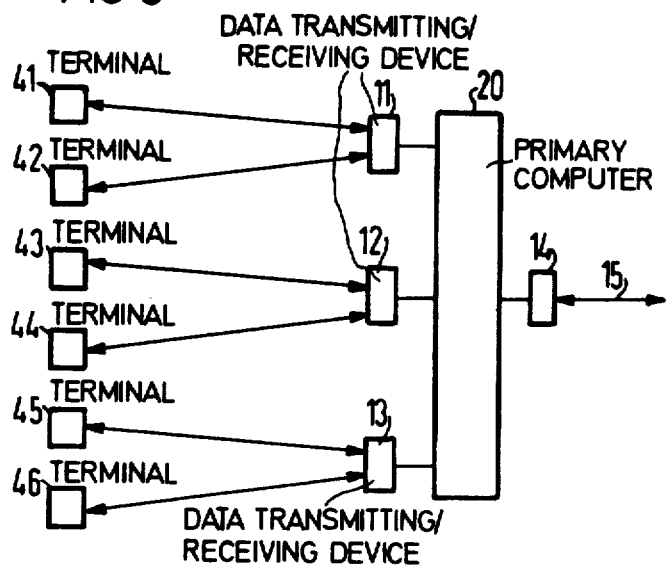
FIG. 3 illustrates an exemplary embodiment of a data processing system arranged in a concentrator structure having a plurality of data transmitting/receiving devices, a plurality of data terminals and a primary computer.

As mentioned above, FIG. 1 illustrates, in block diagram form, a data processing system which includes a plurality of data transmitting/receiving devices 11, 12, 13 and a plurality of primary computers 21, 22 and 23 which can communicate with each other and/or with a larger computer 3 by way of the data transmitting-/receiving devices 11, 12 and 13. The first data transmitting/receiving device 11 is connected to the larger computer 3 by way of a first modem connection line. The third data transmitting/receiving device 13 is likewise connected to the larger computer 3 by way of a second modem connection line.

The three data transmitting/receiving devices 11, 12 and 13 illustrated in the exemplary embodiment of FIG. 1 are connected to one another in the manner specified by way of their respectively remaining first and/or second modem connection lines, so that a data exchange between each of the three primary computers 21, 22 and 23 provided with every other primary computer and/or with the larger computer 3 can be carried out.

As already explained, FIG. 2 illustrates the block diagram of a data transmitting/receiving device 10 having the various devices arranged therein and the connection lines provided for connection to external devices.

Data can be transmitted to and from a further local device, i.e. a further device situated at the location of the data transmitting/receiving device such as, for example, a primary computer, by way of a double-directed local data exchange line 112 and a parallel character interface 105, and can optionally be converted and justified for transmission by a microprocessor 101 in cooperation with a process store 102, oriented bit-wise or character-wise, by means of correspondingly input switching commands which can, in turn, be a component of the information received or exist as a component of the program information of the data transmitting/receiving device in question.

Given bit-oriented data messages, the SDLC method, known per se, or the HDLC method, also known per se, can be carried out. The data messages which can be transmitted or received by way of the first or, respectively, second modem connection line 113 or 114, comprises serial characters. The editing of out-going data messages to be undertaken for the known HDLC or SDLC methods or, respectively, functions required for processing incoming data messages, are carried out by a module 108, in particular, a Z80-SIO, a SDLC/HDLC module. This module emits information to the input-/output device 109 or receives information therefrom. The data to be transmitted or to be received are supplied to or taken from the SDLC/HDLC module 108 by way of a data bus 111. In addition to the microprocessor 101 and the process store 102, the parallel character interface 105, a timer 106, an interrupt control 107 and a parallel interface 103 are also connected to the data bus 111. Such arrangements are known per se, as illustrated and discussed, for example, in "Microprocessor Devices Data Book 1976/77", System SAB 8080, published by Siemens AG, components area, pp, 63–79: "Interfacing the SAB 8080 with other microcomputer devices". This parallel interface 103 is connected by way of a character channel to a driver 104 whose output can be connected by way of a modem control line 115 to a modem which is constructed, for example, as an automatic selection device for data transmission AWD.

Dial connections within a private telephone network, or within the public telephone network, to other data processing devices such as, for example, a large computer, can be completed by way of such an automatic selection device for data transmission AWD.

For completing such a dial connection, corresponding dial information are transmitted from the microprocessor 101 by way of the data bus 111 to the parallel interface 103 and, therefore, to the driver 104. The data messages to be transmitted or to be received are transmitted by way of the telephone network, for example, in multi-frequency code (MFC).

The individual devices of a transmitting/receiving device constructed in accordance with the present invention, namely the device 10 connected to the data bus 111, are addressable by way of an address bus 110. The interrupt control 107 has the task of interrupting respectively cycling procedures due to procedure requests of higher priority. The timer 106 has the task of monitoring chronological sequences of running procedures. Moreover, by means of, it the baud rates are controlled, i.e. the character transmission speeds are controlled.

The parallel character interface 105 is organized interface-specific and mechanically constructed in such a manner that a simple interchangeability is provided.

A further development of the invention provides that a parallel character interface 105 is programmably constructed so that an adaptation to a local data exchange line 112, designed as may be desired, is rendered possible.

Another further development of the invention provides that a plurality of data transmitting/receiving devices 10 are connected to the local data exchange line 112. In a further development of the invention, a plurality of local data processing systems can likewise be connected to the local data exchange line 112. Another further development of the invention provides that a plurality of data transmitting/receiving devices 10 and a plurality of local data processing systems are connected to the local data exchange line 112.

In addition to the task of storing process information, the process store 102, which is usually executed as a read only memory (ROM) or random access memory (RAM) also has the job of operating as a communication buffer for the data to be transmitted or to be received.

As already set forth above, FIG. 3 illustrates an exemplary embodiment of a data processing system arranged in a concentrator structure with a plurality of transmitting/receiving devices 11, 12 and 13 constructed in accordance with the present invention, a plurality of data terminals 41–46 and a primary computer 20. The data transmitting/receiving devices 11, 12 and 13 are respectively connected to the primary computer 20 by way of their local data exchange line and are connected to an individual data terminal, for example the terminal 41, by way of their first or, respectively, second modem connection line 113 or, respectively, 114. The further development of the invention illustrated in FIG. 3 offers the advantage that a multitude of data terminals have access to a central data processing system such as, for example, the primary computer 20, without the exchange-oriented devices which are otherwise necessary.

Figure 4:
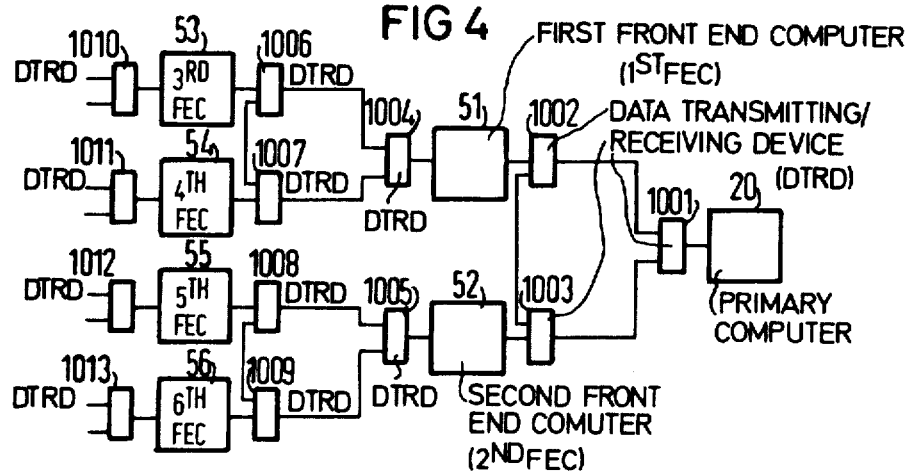
FIG. 4 illustrates an exemplary embodiment of a data processing system illustrated in a tree-like form having a plurality of transmitting/receiving devices constructed in accordance with the present invention, a main computer, first and second input computers and third, fourth, fifth and sixth input computers.

FIG. 4, as likewise already discussed above, illustrates an exemplary embodiment of a data processing system arranged in a tree structure having a plurality of data transmitting/receiving devices 1001-1013 constructed in accordance with the present invention, a primary computer 20, a first front-end computer 51, a second front-end computer 52, and third, fourth, fifth and sixth front-end computers 53–56. It can be derived from this illustration of a further development of the invention that the primary computer 20 is connected to an input computer 51 by way of the appropriate local data exchange line, the data transmitting/receiving device 1001 assigned thereto and the appropriate first or, respectively, second modem connection line and is connected to a second front-end computer 52 by way of the data transmitting/receiving device 1002 or, respectively, 1003 respectively individually assigned to the front-end computers 51, 52, whereby each front-end computer 51, 52 is connected to the first or second modem connection line of the data transmitting/receiving device 1002 or, respectively, 1003 assigned thereto. These two data transmitting/receiving devices 1002 and 1003 are connected to one another by way of respective first or, second modem connection lines. A third front-end computer 53 and a fourth front-end computer 54 are, respectively, a fifth front-end computer 55 and a sixth front-end computer 56 are respectively post-connected to the first and second front-end computers 51 and 52 by means of further data transmitting/receiving devices 1004, 1006, 1007 or 1005, 1008, 1009 in the same manner as the first and second front-end computers 51 and 52 are post-connected to the primary computer 20. A branched, multi-level system structure thereby arises which allows flexibility and time-saving data processing in that partial problems of an entire processing operation are carried out in front-computers specifically provided and programmed for this purpose or, respectively, time-saving partial processing operations to be developed chronologically parallel can be implemented.

Figure 5:
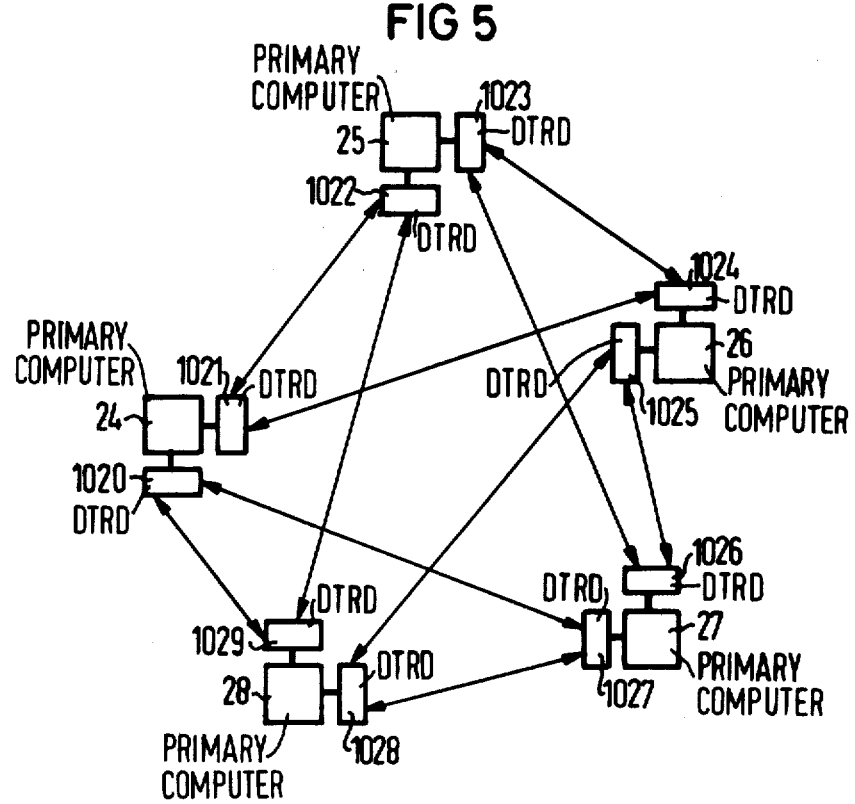
FIG. 5 illustrates an exemplary embodiment of a data processing system arranged in a mesh structure having a plurality of data transmitting/receiving devices of the present invention and a plurality of primary computers.

FIG. 5 illustrates an exemplary embodiment of a data processing system arranged in a mesh network structure having a plurality of data transmitting/receiving devices 1020–1029 and a plurality of primary computers 24–28. Two individual data transmitting/receiving devices 1020, 1021; 1022, 1023; 1024, 1025; 1026, 1027; and 1028, 1029 are assigned to each of these five primary computers 24–28. The first and second modem connection lines of all data transmitting/receiving devices 1020–1029 are interconnected in such a manner with the first and second modem connection lines of the further data transmitting/receiving devices that each of the five primary computers 24–28 can communicate with each of the further primary computers. Such a meshed system structure represents a so-called fault-tolerant system when it is assumed that each of the five main computers can respectively perform the task of any one of the further main computers of the five main computers.

The system structures illustrated in FIGS. 1, 3, 4 and 5 are only exemplary embodiments of the system application of data transmitting/receiving devices constructed in accordance with the present invention. In accordance with the properties of data transmitting/receiving devices of the present invention, further examples of applications not shown herein can be realized. Therefore, for example, a plurality of main computers 20 can be provided, of which respectively two main computers 20 are connected by way of respective data transmitting/receiving devices 10 individually assigned thereto. Another further development of the invention provides that three main computers are provided, that an individual data transmitting/receiving device 10 is assigned to each of the three main computers, and that each data transmitting/receiving device 10 is connected to every further data transmitting/receiving device 10 by way of its first or, respectively, second modem connection line 113 or, respectively, 114, so that every main computer can correspond or communicate with every further main computer.

The relief of the internal data processing device respectively concerned which is attainable by means of practicing the present invention permits the advantageous employment of the arrangements constructed in accordance with the present invention, particularly in data processing systems which work in real-time operation. Included here are, among others, process controls and program-controlled telephone or data communication systems.

Although we have described our invention by reference to particular illustrative embodiments thereof, many changes and modifications thereof may become apparent to those skilled in the art without departing from the spirit and scope of the invention. We therefore intend to include within the patent warranted hereon all such changes and modifications as may reasonably and properly be included within the scope of our contribution to the art.

We claim:

1. In a data transmitting/receiving device of the type having parallel/serial and serial/parallel character conversion and connected via a data transmission line to a local data processing system and connected to a data modem terminating a data communication line for controlling the transmitting and receiving procedures, in which an address bus and a data bus are provided, and in which a procedure memory and a random access memory as a data buffer are connected to the address bus and to the data bus for intercepting data jams, and which includes an interrupt control connected to the address bus and to the data bus for interrupting processing operations of a microprocessor means which is also connected to the address bus and to the data bus in response to processing operations of a higher priority, and in which a timer is connected to the address bus and to the data bus and is operable to set the data transmission speed, the improvement therein comprising:

first and second modem connection lines;
first means in the microprocessor means responsive to corresponding input switching commands to convert data messages into a correspondingly-selected bit or character orientation; and
second means connected to said first and second modem connection lines and to said first means and operable to transmit data selectively in accordance with the synchronous data link control method and the high-level data link control method over a selected modem connection line.

2. In a data transmitting/receiving device, as claimed in claim 1, and further comprising
a local data exchange line for connection to a local data processing system; and
a parallel character interface connected to the microprocessing means and to a local data processing system via said local data exchange line.

3. The data transmitting/receiving device, as claimed in claim 1, wherein:
said parallel character interface is a programmable interface for adapting to different designs of local data exchange lines.

4. A data transmission system comprising:
a plurality of data transmission lines;
a plurality of transmitting/receiving devices each comprising an input/output connected to a respective data transmission line, first and second modem connection lines, data transmission means connected to said first and second modem connection lines and selectively operable to transmit or receive data via said modem connection lines in accordance with the synchronous data link control method or the high-level data link control method, and microprocessing means connected between the respective data transmission line and said data transmission means for receiving, and operable in response to, switching commands to control the operation of said data transmission means;

a first computer;

said transmitting/receiving devices connected in a chain which includes first and last transmitting/receiving devices with said first modem connection line of the first device of said chain connected to said first computer for data exchange therebetween, said second modem connection line of the last device of said chain connected to said computer for data exchange therebetween, and the remaining ones of said first and second modem connection lines interconnected with a second modem connection line connected to a first modem connection line down through the chain for data exchange between adjacent transmitting/receiving devices; and a plurality of second computers each connected to a respective transmitting/receiving device via a respective data transmission line and operable to transmit and receive data via the respective data transmission line.

5. The data transmission system of claim 4, wherein said plurality of second computers comprises three computers.

6. A data transmission system comprising:

a plurality of data transmission lines;

a plurality of transmitting/receiving devices each comprising an input/output connected to a respective data transmission line, first and second modem connection lines, data transmission means connected to said first and second modem connection lines and selectively operable to transmit or receive data via said modem connection lines in accordance with the synchronous data link control method or the high-level data link control method, and microprocessing means connected between the respective data transmission line and said data transmission means for receiving, and operable in response to, switching commands to control the operation of said data transmission means;

said transmitting/receiving devices arranged in first, second and third groups with each group including first, second and third transmitting/receiving devices with said first and second modem connection lines of said first device respectively connected to said second and third devices via respective data transmission lines and said second modem connection line of said second device connected to said first modem connection line of said third device for data transmission therebetween;

a first computer connected to said first transmitting/receiving device of said first group via a respective data transmission line for data exchange therebetween;

a second computer connected between said first modem connection line of said second transmitting/receiving device of said first group and said first transmitting/receiving device of said second group via the respective data transmission line for data exchange therebetween;

a third computer connected between said second modem connection line of said third transmitting/receiving device of said first group and said first transmitting/receiving device of said third group via the respective data transmission line for data exchange therebetween; and third, fourth, fifth, sixth and seventh computers, said fourth and sixth computers connected to said first modem connection lines of said second transmitting/receiving devices of said second and third groups, respectively, and said fifth and seventh computers connected to said second modem connection lines of said third transmitting/receiving devices of said second and third groups, respectively, whereby data exchange may occur between all of said computers.

7. A data transmission system comprising:

a plurality of data transmission lines;

a plurality of transmitting/receiving devices each comprising an input/output connected to a respective data transmission line, first and second modem connection lines, data transmission means connected to said first and second modem lines and selectively operable to transmit or receive data via said modem connection lines in accordance with the synchronous data link control method or the high-level data link control method, and microprocessing means connected between the respective data transmission line and said data transmission means for receiving, and operable in response to, switching commands to control the operation of said data transmission means;

a plurality of computers, each connected to a separate pair of said transmitting/receiving devices via respective data transmission lines; and each of said data transmitting/receiving devices having its modem connection lines connected to the modem connection lines of two other of said transmitting/receiving devices which are connected to different computers.

8. The data transmission system of claim 7, wherein said plurality of computers comprises five computers.

9. A data transmission system comprising:

a plurality of data transmission lines;

a plurality of transmitting/receiving devices each comprising an input/output connected to a respective data transmission line, first and second modem connection lines, data transmission means connected to said first and second modem lines and selectively operable to transmit or receive data via said modem connection lines in accordance with the synchronous data link control method or the high-level data link control method, and microprocessing means connected between the respective data transmission line and said data transmission means for receiving, and operable in response to, switching commands to control the operation of said data transmission means;

a plurality of data terminals, each of said modem connection lines connected to a respective data terminal for data exchange therebetween; and a computer connected to each of said data transmission lines for data exchange therebetween.

* * * * *